United States Patent [19]

Miller

[11] Patent Number: 4,764,274

[45] Date of Patent: Aug. 16, 1988

[54] WATER FILTER UNIT AND DISPENSER

[76] Inventor: Bernard Miller, 11 Fig Tree Rd., Rancho Palos Verdes, Calif. 90274

[21] Appl. No.: 799,590

[22] Filed: Nov. 19, 1985

[51] Int. Cl.⁴ .................. B01D 27/08; B01D 35/02
[52] U.S. Cl. ........................... 210/232; 210/266; 210/282; 210/464; 210/469; 210/477; 210/482; 210/489; 222/189
[58] Field of Search ............. 210/464, 465, 477, 479, 210/489, 282, 482, 266, 232, 244, 467, 238, 469; 222/189

[56] References Cited

U.S. PATENT DOCUMENTS

| | | | |
|---|---|---|---|
| 444,013 | 1/1891 | Paddock | 210/489 |
| 2,389,185 | 11/1945 | Dick | 210/489 |
| 4,025,438 | 5/1977 | Gelman et al. | 210/489 |
| 4,491,520 | 1/1985 | Jaye | 210/282 |
| 4,623,457 | 11/1986 | Hankammer | 210/237 |

FOREIGN PATENT DOCUMENTS

81/00842  4/1981  Int'l Pat. Institute ............. 222/189

Primary Examiner—Richard V. Fisher
Assistant Examiner—Linda S. Evans
Attorney, Agent, or Firm—Edward A. Sokolski

[57] ABSTRACT

A replaceable water filter unit which can be used with a water pitcher, water bottle, or other such water dispensing device utilizes activated charcoal particles which are sandwiched between a pair of pads which may be fabricated of polyester felt batting material. The pads and charcoal particles sandwiched therebetween are installed in a frusto-conical housing with the pads in tight abutment against the side walls of the housing. The opposite end walls of the housing are apertured and each of the pads is installed directly opposite one of these end wall portions. The housing is removably installed in the outlet portion of the water dispensing device such that the water passes through the pads and the charcoal particles when being dispensed.

7 Claims, 3 Drawing Sheets

WATER FILTER UNIT AND DISPENSER

This invention relates to water filters and more particularly to a replaceable water filter unit that can be installed in the outlet portion of a water dispensing device such as a pitcher or a water bottle.

There is an ongoing demand for a simple and economical water filter to remove undesirable ingredients such as chlorine, rust, etc. from tap water. Carbon particles and fiber type filter elements have been found to be quite useful for such filtering action. Some such units have been designed for installation on water faucets. However, these units often have limited filtering capacity and are expended rather rapidly in view of the fact that most users will run water through the filter for washing and purposes other than drinking which dissipates the filter unnecessarily.

The device of the present invention provides a simple economical filter element which can be replaceably installed in the outlet of a drinking water dispenser such as a pitcher or a water bottle. The device of the present invention can be rapidly installed in and removed from the dispenser for ready replacement and is of simple and economical construction.

Briefly described the device of the invention comprises a pair of pads of a suitable filtering material such as polyester felt batting between which is sandwiched a bed of charcoal granules. This "sandwich" is installed in a housing or casing which may be generally of cylindrical form and may taper to form a frusto-conical section, with the edges of the pads in abutment against the side walls of the casing and the opposite surfaces of each of the pads directly opposite one or the other of the ends of the casing. The ends of the casing are apertured to permit the free entry of water therethrough. The filter unit thus formed is installed in the water dispensing end of a water container such as a pitcher or water bottle such that the water to be dispensed runs through the filter element and is exited therefrom for dispensing from the container's outlet. It is therefore an object of this invention to provide an improved replaceable water filtering element for installation in a drinking water dispenser such as a pitcher or water bottle.

It is a further object of this invention to provide an improved replaceable water filter element of highly economical construction.

Other objects of this invention will become apparent as the description proceeds in connection with the accompanying drawings of which:

Figure 1:
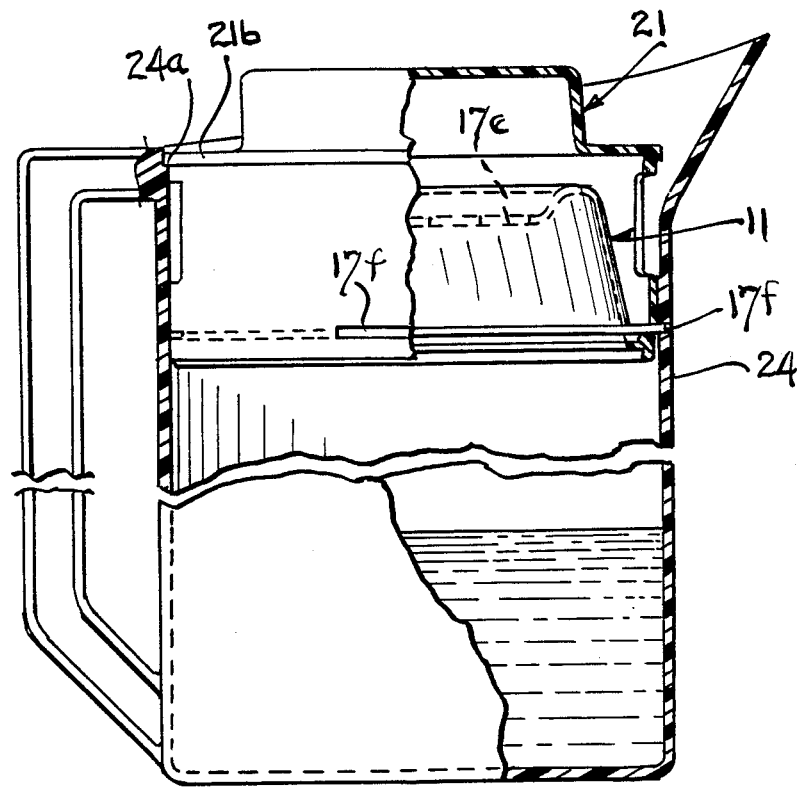
FIG. 1 is a side elevational view partially in cross section showing a preferred embodiment of the invention installed in a water pitcher.
Figure 2:
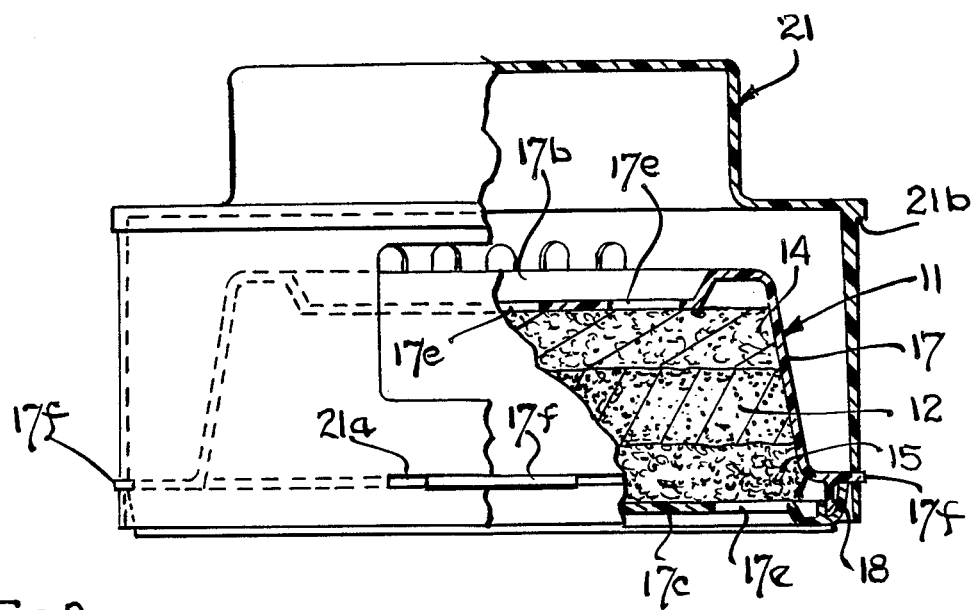
FIG. 2 is a side elevational view partially in cross section of the preferred embodiment.
Figure 3:
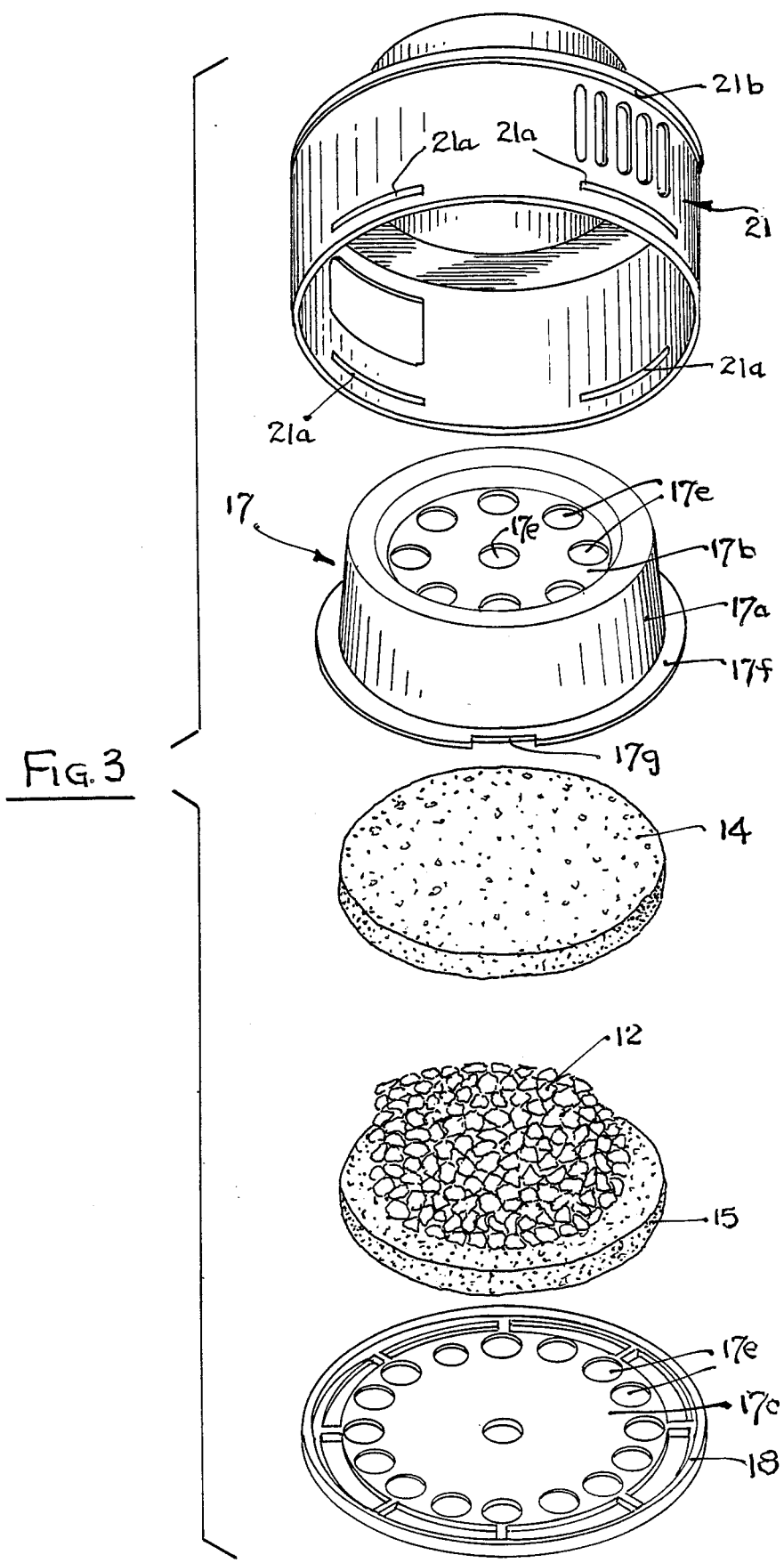
FIG. 3 is an exploded view of the preferred embodiment.

Referring to FIGS. 1-3 the preferred embodiment of the invention as adapted for installation in a water pitcher is illustrated. Filter element 11 comprises a bed of charcoal particles 12 which is sandwiched between a pair of fibrous filter pads 14 and 15 which may be of polyester filled batting material of four ounce weight and one-half inch in thickness. The pads may be made from a commercially available material such as polyester fiber type TR407TB available from LA Sanifelt Co., Los Angeles, Calif. The charcoal particles 12 are typically of the granular type of activated charcoal for use in water filters. Such charcoal particles of burnt coconut shell having a size of about 12×30 mm have been found to operate satisfactorily. The filter formed by charcoal particles 12 sandwiched between circular pads 14 and 15 are installed within housing or casing 17, this casing having frusto-conical shaped side wall portion 17a and substantially flat end wall portions 17b and 17c each of which has a plurality of apertures 17e formed therein. The edges of pads 14 and 15 abut tightly against side walls 17a and may be heat sealed thereto, with the upper surface of pad 14 abutting against the inner surface of top end wall 17b and the bottom surface of pad 15 abutting against the inner surface of end wall 17c. End wall 17c has a grooved rim portion 18 which snaps onto the bottom edge 17g of the casing to hold wall 17c in retention. Housing 17 has a rim 17f formed thereon which snaps into slots 21a which are formed in the side walls of cover member 21 for pitcher 24. Cover 21 has a rim portion 21b thereon which rests on a ridge 24a formed in the inner wall of the pitcher.

Thus, it can be seen that the water as it is being poured passes through the apertures 17e in bottom end wall 17c of the housing and through the filter elements formed by pads 14 and 15 and charcoal particles 12 and out of the housing through apertures 17e formed in top end wall 17b to be dispensed through the spout of the pitcher.

When the filter needs to be replaced the housing 17 can easily and rapidly be removed from cover 21 and replaced with a new element.

Figure 4:
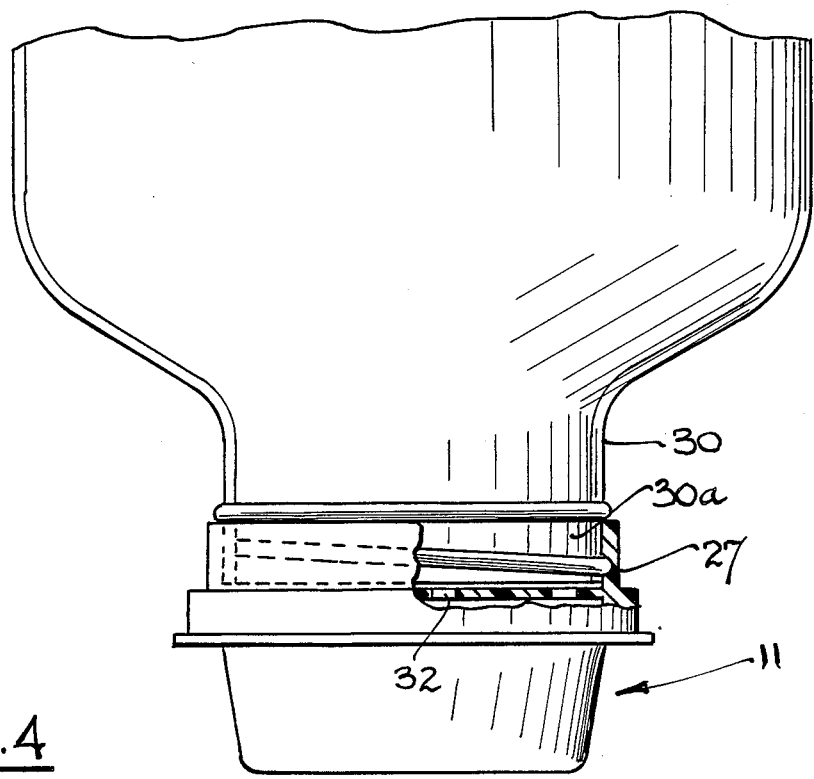
FIG. 4 is a side elevational view illustrating a version of the preferred embodiment installed on a water bottle.
Figure 5:
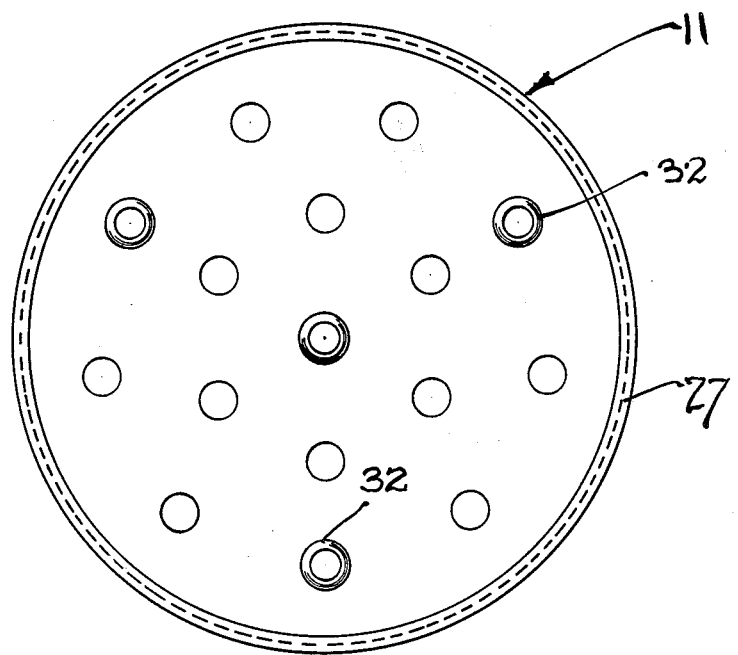
FIG. 5 is a bottom plan view of the version of the invention suitable for installation on a water bottle.

Referring now to FIGS. 4 and 5, the subject unit is shown as adapted for use with a water bottle 30. The filter unit 11 employed is the same as that described for the first embodiment but rather than being installed in a pitcher cover is rather attached by suitable means such as rivets 32 to threaded adapter member 27 which can be threadably attached to the threaded end 30a of the water bottle 30; this bottle being of a type suitable for installation in a water dispenser-cooler unit.

While the invention has been described and illustrated in detail, it should be clearly understood that this is intended by way of illustration and example only and is not to be taken by way of limitation. The spirit and scope of this invention being limited only by the terms of the following claims.

I claim:

1. In combination with a water container and dispenser having an outlet, a water filter unit for use in filtering water as it is dispensed from said water container and dispenser comprising:

a housing having a side wall and a pair of opposing apertured end walls, one of said end walls being integrally formed with said housing, the other of said end walls being removably attached to said side wall, said other end wall having a grooved rim which snaps onto a bottom edge of said side wall, a pair of similar fibrous filter pads, said pads each having opposite broad surfaces and side edges, a bed of charcoal particles, said filter pads being mounted in said housing with one of the broad surfaces of one of said pads abutting against one of the apertured end walls of the housing, one of the broad surfaces of the other of said pads abutting against the other of said apertured end walls of the housing, and the side edges of said pads abutting tightly against the side wall of said housing, the bed of charcoal particles being sandwiched between said pads, and said housing being installed in said container and dispenser with one of the apertured end walls facing the interior of said container and dispenser and the other of said apertured end walls facing the outlet of said container and dispenser.

2. The combination of claim 1 wherein said pads are circular and said housing is frusto-conical.

3. The combination of claim 1 wherein said water container and dispenser is a pitcher having an apertured cover, said filter being removably fitted in said cover.

4. The combination of claim 1 wherein said water container and dispenser is a water bottle having a lip at its outlet and means for removably attaching said filter unit to the lip of said water bottle.

5. In combination with a water container and dispenser having an outlet and a removable cover, a water filter unit removably installed in said cover for filtering water as it is dispensed from said water container and dispenser comprising:

a housing having a side wall, a pair of opposing apertured end walls and a rim extending radially outwardly from said side wall, a pair of similar fibrous filter pads, said pads each having opposite broad surfaces and side edges, a bed of charcoal particles, said filter pads being mounted in said housing with one of the broad surfaces of each of said pads abutting against a separate one of the apertured end walls of the housing and the side edges of said pads abutting tightly against the side wall of said housing, the bed of charcoal particles being sandwiched between the pads, said removable cover having an apertured side wall for passing water and means defining a plurality of slots formed therein, said housing rim snapping into said slots to removably retain the housing to said cover, and said cover being installed in said container and dispenser such that when water is dispensed from the container and dispenser it passes from the filter into the cover and out through the apertured side wall of said cover.

6. The combination of claim 5 wherein one of the end walls of the housing is removably attached thereto, said one of said end walls having a grooved rim which snaps onto a bottom edge of the side wall.

7. The combination of claim 5 wherein said container and dispenser has a ridge formed therein, said cover having a rim which rests on said ridge.

* * * * *